US006337436B1

(12) United States Patent
Ganz

(10) Patent No.: US 6,337,436 B1
(45) Date of Patent: Jan. 8, 2002

(54) SOLAR MODULE FOR ATTACHMENT TO MOTOR VEHICLES AND A PROCESS FOR ITS MANUFACTURE

(75) Inventor: Thomas Ganz, Stockdorf (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/564,503

(22) Filed: May 4, 2000

(30) Foreign Application Priority Data

May 7, 1999 (DE) .......................................... 199 21 265

(51) Int. Cl.[7] .............................................. H01L 25/00
(52) U.S. Cl. ................... 136/251; 136/244; 136/245; 136/291; 136/293; 438/66; 438/57
(58) Field of Search ................................ 136/251, 244, 136/245, 291, 293; 438/66, 57

(56) References Cited

U.S. PATENT DOCUMENTS 4,832,755 A * 5/1989 Barton et al. ............... 136/251
5,059,254 A * 10/1991 Yaba et al. .................. 136/251
5,154,481 A   10/1992 Paetz et al. .................. 296/211
5,545,261 A * 8/1996 Ganz et al. .................. 136/251
6,066,796 A * 5/2000 Itoyama et al. ............. 136/251

FOREIGN PATENT DOCUMENTS

DE    297 14 217        12/1997
DE    19928116 C1 *    9/2000
EP    0 793 278          9/1997

* cited by examiner

Primary Examiner—Alan Diamond
(74) Attorney, Agent, or Firm—Nixon Peabody LLP; David S. Safran

(57) ABSTRACT

A solar module (10) for mounting on motor vehicles, which is provided with a top cover layer (12) and a bottom cover layer (14), between which a solar generator (18) is embedded which has a plurality of electrically interconnected solar cells (20), and with two electrical connections (28, 30) on a connection side for tapping of the solar current generated by the solar generator. There are connections (28, 30) on a connection socket (26) which is located on one side of the solar module (10), and of which the side (32) facing away from the connection side is embedded in a sealed manner between the two cover layers (12, 24).

17 Claims, 1 Drawing Sheet

SOLAR MODULE FOR ATTACHMENT TO MOTOR VEHICLES AND A PROCESS FOR ITS MANUFACTURE

BACKGROUND OF THE INVENTION

1. Field of the Invention

This invention relates to a solar module for attachment to vehicles, such as motor vehicles, recreational vehicles (RV's), campers, trailers, boats, and the like, with a top cover layer and a bottom cover layer between which a solar generator is embedded which has several electrically interconnected solar cells, and two electrical connections for tapping of the solar current generated by the solar generator which are formed by a connection socket which is located on a side of the solar module, and to a process for manufacturing such a solar module.

2. Description of Related Art

Generally, solar modules for attachment to motor vehicles are conventionally made as film solar modules, i.e., the cover layers are each formed by a flexible film between which the solar cells are embedded. In these solar modules, the electrical connections are conventionally formed by an elastic cable with a fixed length, for example, 5 m, which is routed from the solar generator through the upper or the lower cover layer or cover film, a so-called cable cap being provided at the penetration site, which cap at the same time provides for sealing of the passage site and forms tension relief for the cable. The cable cap is attached after the solar generator is laminated in between the two cover layers. Several modules are conventionally wired in separate distributor boxes.

In these solar modules, the main problem is to achieve good adhesion of the cable cap to the module cover film and a good seal of the passage site of the cable through the module cover film. Here, industrially hazardous processes are necessary, such as gas flaming and priming, which makes manufacture complex and thus expensive. Furthermore, the modules are delivered with a fixed cable length so that, under certain circumstances, the users must undertake extension which is resistant to open air and which is also associated with additional accident risks.

Furthermore, standard solar modules, for example, for use on buildings, are known which are provided on the back with receptacles in order to establish electrical connection to the consumer, see, for example, published German Utility Model DE 297 14 217 U1 and published European Patent Application EP 0 793 278 A2.

U.S. Pat. No. 5,154,481 discloses a solar cover for an openable motor vehicle roof in which, underneath a pane of glass, there is a solar cell film with electrodes which are connected near the front edge of the cover to two flat connectors which are each accommodated by a connector housing which is inserted into a cutout of a frame-shaped inside cover sheet. The electrodes and the flat connectors extend downward, i.e., perpendicular to the cover plane. A contact plug is inserted from underneath into each flat connector in an electrically conductive connection.

SUMMARY OF THE INVENTION

The primary object of the present invention is to devise a solar module with electrical connections which can be formed easily and economically.

Furthermore, another object of this invention is to devise a production process for this solar module.

The aforementioned objects are achieved by a solar module of the initially mentioned type in which the side of the connection socket facing away from the connection side is embedded so as to be sealed between the two cover layers, and by a process for producing such a solar module with an embedded connection socket.

In this approach in accordance with the invention, it is advantageous that later sealing of the penetration of the connections of the solar module is not necessary after embedding the solar generator between the cover layers. In particular, there are no industrially hazardous processes which make production complex and expensive, and still a good seal of the solar module is achieved. Several modules can be wired by using a corresponding cable set without the use of distributor boxes. Since the line and the module are separable, one module can be made accessible to several applications, for example, a refrigerated box, laptop and boat. Furthermore, the plug connection makes the module easy to replace in case of damage and easier to handle during transport. In addition, possible piecing together of the cabling is eliminated since the user can establish the cable length himself.

Preferably, the solar module is made flexible, the cover layers preferably being made as protective films, and the solar generator and the connection socket being sealed between the protective films. The connections are preferably oriented parallel to the module plane, preferably being arranged such that they lie in a plane which is parallel to the module plane.

Phase or bypass diodes can be integrated into the connection socket.

Preferably, the connection socket is made such that, in interplay with a correspondingly formed plug of an electrical connection line, it forms a watertight electrical connection between the solar generator and the connection line.

The solar module is preferably made for attachment on an arched outer surface of a vehicle, for example, motor vehicles (e.g., automobiles and trucks), recreational vehicles (RV's), campers, trailers, boats, and the like.

Preferably, the solar module is not thicker than 5 mm. If the solar module is intended for a boat, it is preferably made to be walked upon.

In the following, one embodiment of the invention is explained by way of example using the attached drawings.

DETAILED DESCRIPTION OF THE INVENTION

Figure 1:
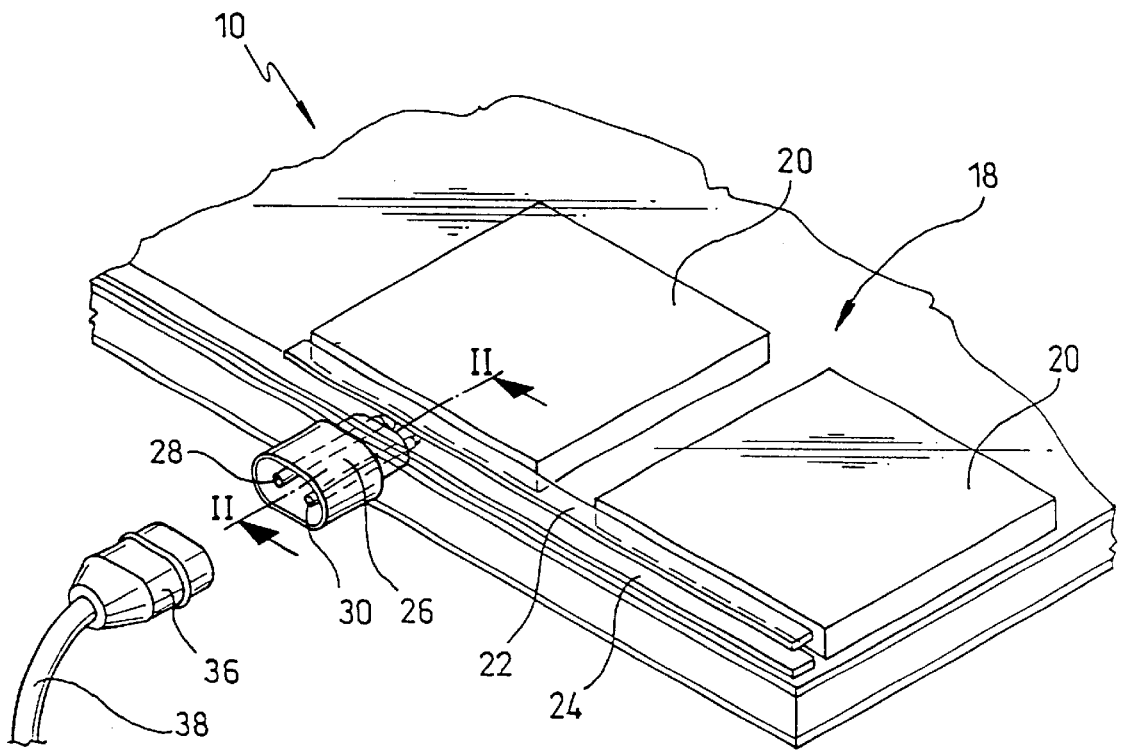
FIG. 1 schematically shows a perspective view of a solar module in accordance with the invention.
Figure 2:
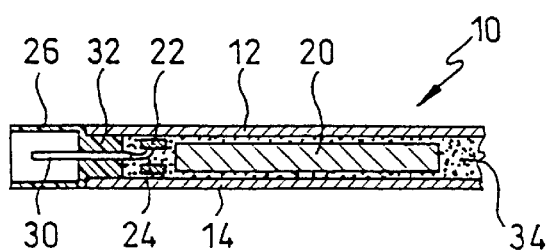
FIG. 2 shows a sectional view along taken along line II—II from FIG. 1.

As shown in FIGS. 1 and 2, a solar module 10 comprises a top cover film 12 and a bottom cover film 14 between which a solar generator 18 is embedded which comprises several solar cells 20 (of which only two are shown in FIG. 1) which are electrically interconnected by means of the corresponding connectors. Of these electrical connectors, in FIGS. 1 and 2, for example, only two collective connectors 22 and 24 are shown. Preferably, the solar cells 20 are arranged in parallel-connected groups of several solar cells 20 which are each series connected, two collective connectors 22, 24 being provided for the individual groups and forming the two terminal poles of the solar generator 18. The cover films 12 and 14 are preferably made as weather-resistant, saltwater-proof and UV light-resistant protective films which can also be walked upon. The solar module 10 is made flexible overall such that it can be attached to the arched outer surfaces of vehicles, such as motor vehicles (e.g., automobiles and trucks), recreational vehicles (RV's), campers, trailers, boats, and the like. Furthermore, the solar module 10 is made to be so stable and fixed to the vehicle that it will not be damaged during moving of the vehicle, and is well suited for powering of power consuming accessories of and/or in the vehicle, e.g., radio, television, lights, stove, etcetera. Preferably, the solar module 10 is made for detachable connection to a motor vehicle, for example, by means of a Velcro® hook and loop type fastener strip.

On one side surface of the solar module 10, there is a connection socket 26 which has at least two electrical connections 28 and 30 which lie in the plane of the module, i.e., the connections 28, 30 are located in a horizontal position. The part 32 of the connection socket 26 which faces away from the connection side, i.e., the rear or inner part, is embedded so as to be sealed between the two cover films 12 and 14 in a similar manner to the solar generator 18. The connection 30 is electrically connected to one collective connector 22, while the other connection 28 is connected to the collective connector 24. Preferably, the solar generator 18 and the connection socket 26 are sealed or laminated between the protective films 12 and 14 into a embedding material 34.

Phase or bypass diodes (not shown in FIGS. 1 and 2) can be integrated into the connection socket 26.

A corresponding plug 36 with a connecting cable 38 which leads to a consumer is made such that in interplay with a correspondingly made connection socket 26, when it is inserted into the latter, it forms a water-tight electrical connection between the solar generator 18 and the connecting cable 38. The length of the connecting cable 38 can be flexibly chosen by the user depending on the desired use of the solar module 10. By choosing the correspondingly made connecting lines or cables 38 several solar modules 10 can be wired as desired. Instead of into the connection socket 26, phase or bypass diodes can also be integrated into the plug 36.

The solar module 10 is produced such that the solar generator 18 and the inner connection socket part 32 are placed between the protective films 12 and 14, the connection 28 being electrically connected to the collective connector 24 and the connection 30 to the collective connector 22. Then the two protective films 12 and 14 are sealed to one another such that the inner connection socket part 32 and the solar generator 18 are embedded in a sealed manner between the two protective films 12 and 14.

By choosing a corresponding connection cable 38, it is possible for a solar module 10 to be able to serve several consumers at the same time or in succession.

A solar module in accordance with the invention is also outstandingly well suited for a fixed motor vehicle part or a movable motor vehicle part, for example, a wind deflection louver, a cover of a sliding and lifting roof, a raisable roof, a louvered roof. In that context, it facilitates installation and replacement in case of repair.

While only a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A flexible solar module for mounting on vehicles, comprising a top cover layer, a bottom cover layer, a solar generator, embedded in an embedding material located between the top and bottom cover layers, which has a plurality of electrically interconnected solar cells, and two electrical connections for tapping of solar current generated by the solar generator, the connections having a connection socket which is located on a side of the solar module; wherein a part of the connection socket facing away from the connection side is embedded in a sealed manner in the embedding material between the two cover layers.

2. Solar module as claimed in claim 1, wherein the cover layers are protective films.

3. Solar module as claimed in claim 2, wherein the solar generator and the part of the connection socket which faces away from the connection side are sealed in between the protective films.

4. Solar module as claimed in claim 3, wherein the protective films are weather-resistant, saltwater-proof and resistant to UV light.

5. Solar module as claimed in claim 4, wherein the solar module is configured for attachment on an arched outside surface of a motor vehicle.

6. Solar module as claimed in claim 1, wherein the solar module is configured for attachment on one of a camper, van, and boat.

7. Solar module as claimed in claim 6, wherein the solar module is made for powering of vehicle power consuming accessories.

8. Solar module as claimed in claim 1, wherein the solar module is detachably mountable on motor vehicles.

9. Solar module as claimed in claim 1, wherein the solar module is able to be walked upon.

10. Solar module as claimed in claim 1, wherein the solar module is at most 5 mm thick.

11. Solar module as claimed in claim 1, wherein the connections are oriented parallel to a major plane of the module.

12. Solar module as claimed in claim 11, wherein the connections are arranged such that they are located in a horizontal plane which is parallel to the major plane.

13. Solar module as claimed in claim 1, wherein phase or bypass diodes are integrated into the connection socket.

14. Solar module as claimed in claim 1, wherein the connection socket receives a correspondingly shaped plug of an electrical connection line and forms a watertight electrical connection between the solar generator and the connection line.

15. Solar module as claimed in claim 1, wherein the solar cells are arranged in parallel connected groups of solar cells which are each series connected, two collective connectors being provided for the groups and each connection of the connection socket being electrically connected to one of the collective connectors.

16. Solar module as claimed in claim 1, wherein the solar module is configured for being located on a vehicle roof part.

17. Process for producing a flexible solar module for mounting on vehicles having a solar generator with a plurality of electrically interconnected solar cells embedded between the top and bottom cover layers and electrically connected to two connections on a connection socket having a connection side for tapping of solar current generated by the solar generator, comprising the steps of providing top and bottom cover layers that are flexible; disposing a solar generator between the flexible top and bottom cover layers; and embedding a part of the connection socket which faces away from the connection side in a sealed manner within an embedding material which is inserted between the top and bottom cover layers.

* * * * *